US010726076B2

(12) United States Patent
Maita et al.

(10) Patent No.: US 10,726,076 B2
(45) Date of Patent: Jul. 28, 2020

(54) INFORMATION ACQUISITION METHOD, AND INFORMATION ACQUISITION DEVICE

(71) Applicant: FUJITSU LIMITED, Kawasaki-shi, Kanagawa (JP)

(72) Inventors: Tsuyoshi Maita, Aomori (JP); Nobumi Noro, Aomori (JP); Tetsu Tanaka, Hirosaki (JP)

(73) Assignee: FUJITSU LIMITED, Kawasaki (JP)

(*) Notice: Subject to any disclaimer, the term of this patent is extended or adjusted under 35 U.S.C. 154(b) by 90 days.

(21) Appl. No.: 15/590,629

(22) Filed: May 9, 2017

(65) Prior Publication Data
US 2017/0242853 A1 Aug. 24, 2017

Related U.S. Application Data

(63) Continuation of application No. PCT/JP2014/080269, filed on Nov. 14, 2014.

(51) Int. Cl.
G06F 16/93 (2019.01)
G06F 16/00 (2019.01)
(Continued)

(52) U.S. Cl.
CPC .............. G06F 16/94 (2019.01); G06F 16/00 (2019.01); G06F 16/164 (2019.01);
(Continued)

(58) Field of Classification Search
USPC .................................................. 365/189.05
See application file for complete search history.

(56) References Cited

U.S. PATENT DOCUMENTS 9,304,976 B1* 4/2016 Cashmore ............. G06F 17/212
2012/0311436 A1* 12/2012 Steele ................... G06F 17/212
715/246
2014/0245115 A1* 8/2014 Zhang .................... G06F 17/24
715/202

FOREIGN PATENT DOCUMENTS

JP 2002-169836 6/2002
JP 2004-86272 3/2004
(Continued)

OTHER PUBLICATIONS

International Search Report dated Feb. 24, 2015 in corresponding International Application No. PCT/JP2014/080269**.
(Continued)

Primary Examiner — Huan Hoang
Assistant Examiner — Muna A Techane
(74) Attorney, Agent, or Firm — Staas & Halsey LLP

(57) ABSTRACT

An information acquisition method includes: acquiring a specific piece of data using information for specifying a position of the specific piece of data in a document of a certain site by referring to a storage that stores therein information for specifying the position of the specific piece of data in the document of the certain site and information for specifying a position of another piece of data having a predetermined relation to the specific piece of data in the document, by a processor; and acquiring the other piece of data using the position of the other piece of data related to the specific piece of data in the document by referring to the storage, and acquiring data having the predetermined relation to the other piece of data using the acquired other piece of data, by the processor.

7 Claims, 10 Drawing Sheets

(51) Int. Cl.
*G06F 16/16* (2019.01)
*G06F 16/951* (2019.01)
*G06F 40/106* (2020.01)
*G06F 40/114* (2020.01)
*G06F 40/117* (2020.01)
*G06F 40/134* (2020.01)
*G06F 40/137* (2020.01)
*G06F 16/14* (2019.01)
*G06F 40/103* (2020.01)

(52) U.S. Cl.
CPC .......... *G06F 16/951* (2019.01); *G06F 40/106* (2020.01); *G06F 40/114* (2020.01); *G06F 40/117* (2020.01); *G06F 40/134* (2020.01); *G06F 40/137* (2020.01); *G06F 16/14* (2019.01); *G06F 40/103* (2020.01)

(56) References Cited

FOREIGN PATENT DOCUMENTS

| JP | 200486272 | * | 3/2004 | ............. G06F 17/30 |
|----|-----------|---|--------|-----------|
| JP | 2008-250404 | | 10/2008 | |
| JP | 2008-282114 | | 11/2008 | |
| JP | 2011-150462 | | 8/2011 | |
| WO | WO 2008/142791 | | 11/2008 | |

OTHER PUBLICATIONS

Written Opinion Of The International Searching Authority dated Feb. 24, 2015 in corresponding International Application No. PCT/JP2014/080269.

"How to extract specific information from web pages", Oct. 18, 2014, 3 pages, [Retrieved from URL: http://web.archive.org/web/20141018004250/http://www.opensearchserver.com/documentation/faq/crawling/how_to_extract_specific_information_from_web_pages.md], retrieved on Aug. 29, 2017**.

Extended European Search Report dated Sep. 7, 2017 in corresponding European Patent Application No. 14905987.5.

"Match regex at exact offset," Apr. 27, 2012, retrieved from the Internet: https://stackoverflow.com/uestions/4983703/match-regex-at-exact-offset, XP055503394, 6 pgs.**

"Thread: Script to automatically search google?" Oct. 22, 2010, retrieved from the Internet: https://ubuntuforums.org/showthread.php?t=1601843, XP055503434, 5 pgs.**

Office Action dated Sep. 6, 2018 in corresponding European Patent Application No. 14 905 987.5, 7 pgs.

Office Action dated Apr. 18, 2019 in corresponding European Patent Application No. 14905987.5 (7 pages).

* cited by examiner

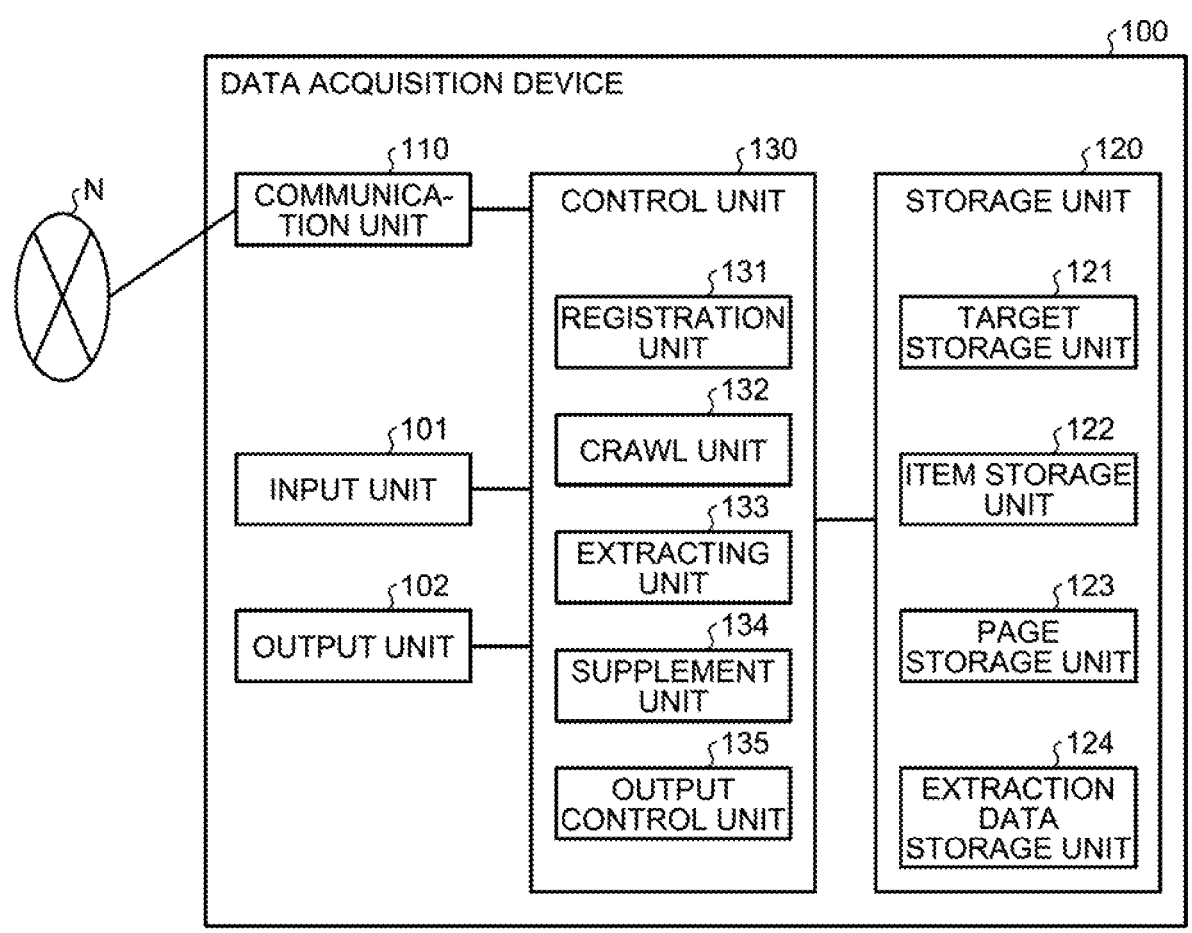

FIG.2

| URL ID | TARGET URL | POSITION SPECIFYING INFORMATION OF EXTRACTION TARGET PORTION | | |
|---|---|---|---|---|
| | | TITLE | ADDRESS | ⋮ |
| 1 | http://aaaaa.bbb.ccc/ddd/eee/001.html | \<DIV class="title"\> \</DIV\>, ORDER:1, /title/ | \<DIV class="address"\> \</DIV\>, ORDER:1, /info/address/ | ⋮ |
| 2 | http://aaaaa.bbb.ccc/ddd/eee/002.html | \<DIV class="title"\> \</DIV\>, ORDER:2, /tps/table/ | /\<DIV *\>(.+)\</DIV\>/ /ADDRESS:(.+)$/, ORDER:3, /info/address/ | ⋮ |
| 3 | http://aaaaa.bbb.ccc/ddd/eee/003.html | div#left h2, ORDER:3, /tps/table/ | #infoContent @\<h3\>¥s+?\<p\>(.+?)\</p\>@is, ORDER:5, /info/address/ | ⋮ |
| ⋮ | ⋮ | ⋮ | ⋮ | ⋮ |

| ITEM ID | DATA NAME | DATA TYPE | SEGMENTATION METHOD | RELATION | ... |
|---|---|---|---|---|---|
| 1 | TITLE | CHARACTER | CSS SELECTOR | ADDRESS, PHONE NUMBER | ... |
| 2 | ADDRESS | CHARACTER | CSS SELECTOR, REGULAR EXPRESSION | FACILITY NAME, PHONE NUMBER, POSITIONAL INFORMATION | ... |
| 3 | FACILITY NAME | CHARACTER | CSS SELECTOR, REGULAR EXPRESSION | TITLE, ADDRESS, PHONE NUMBER | ... |
| 4 | PHONE NUMBER | NUMERAL | CSS SELECTOR, REGULAR EXPRESSION | TITLE, ADDRESS | ... |
| 5 | UPDATE DATE | DATE | REGULAR EXPRESSION | TITLE, EXPLANATION | ... |
| 6 | POSITIONAL INFORMATION | LATITUDE AND LONGITUDE | CSS SELECTOR, REGULAR EXPRESSION | ADDRESS, FACILITY NAME, PHONE NUMBER | ... |
| 7 | EXPLANATION | CHARACTER | CSS SELECTOR | TITLE, UPDATE DATE | ... |
| ... | ... | ... | ... | ... | ... |

| URLID | TARGET URL | STORAGE AREA | |
|---|---|---|---|
| 1 | http://aaaa.bbb.ccc/ddd/eee/001.html | D:¥page¥aaaa.bbb.ccc¥ddd¥eee¥001 | ... |
| 2 | http://aaaa.bbb.ccc/ddd/eee/002.html | D:¥page¥aaaa.bbb.ccc¥ddd¥eee¥002 | ... |
| 3 | http://aaaa.bbb.ccc/ddd/eee/003.html | D:¥page¥aaaa.bbb.ccc¥ddd¥eee¥003 | ... |
| ... | ... | ... | ... |

| URLID | TITLE | ADDRESS | FACILITY NAME | PHONE NUMBER | UPDATE DATE | POSITIONAL INFORMATION | EXPLANATION | ... |
|---|---|---|---|---|---|---|---|---|
| 1 | SPECIAL HISTORICAL SITE SANNAI-MARUYAMA SITE | AOMORI CITY, SANNNAI AZA MARUYAMA xxx | SANNAI-MARUYAMA SITE | 017-781-xxxx | 2014/10/20 | N40°8'12" E140°6'956" | SPECIAL HISTORICAL SITE OF SANNAI-MARUYAMA SITE IS... | ... |
| 2 | TOWADA-HACHIMANTAI NATIONAL PARK HAKKODA ROPEWAY | AOMORI CITY, ARAKAWA AZA KANSUIZAWA yyy | HAKKODA ROPEWAY | 017-738-yyyy | 2014/10/29 | N40°68'08" E140°83'18" | HAKKODA ROPEWAY IS... | ... |
| 3 | TSUGARU-HAN NEPUTA-MURA HOMEPAGE | AOMORI-KEN, HIROSAKI CITY, KAMENOKO-MACHI zzz | TSUGARU-HAN NEPUTA-MURA | 0172-39-zzzz | 2014/6/3 | N40°61'15" E140°46'92" | TSUGARU-HAN NEPUTA-MURA IS... | ... |
| ... | ... | ... | ... | ... | ... | ... | ... | ... |

INFORMATION ACQUISITION METHOD, AND INFORMATION ACQUISITION DEVICE

CROSS-REFERENCE TO RELATED APPLICATION

This application is a continuation application of International Application PCT/JP2014/080269, filed on Nov. 14, 2014, and designating the U.S., the entire contents of which are incorporated herein by reference.

FIELD

The present invention relates to an information acquisition program, an information acquisition method, and an information acquisition device.

BACKGROUND

As a tool for collecting information disclosed on the Internet, a crawler tool is known. The crawler tool crawls homepages on the Internet, and stores content thereof in units of a uniform resource locator (URL), that is, in units of a page. Developed is a technique of extracting, from the content of the homepages, data used for an item in a layout form desired by a user to generate integrated data, and outputting the integrated data in accordance with the layout form. Additionally, developed is a technique of extracting data again when a blank column remains in a data input part on the layout form.

Also developed is a technique of acquiring data corresponding to structure information designated in advance from structured data that is structured using the structure information, and arranging the data in a template. Additionally, developed is a technique of transmitting information related to supplement of data when at least part of the data corresponding to the structure information is not present.

Patent Document 1: Japanese Laid-open Patent Publication No. 2002-169836
Patent Document 2: Japanese Laid-open Patent Publication No. 2008-282114

However, for example, even when the data is extracted again while changing an extraction condition or information related to supplement of data is transmitted, desired data corresponding to the layout form or a column of the template is not obtained in some cases. Thus, in a case of generating a document using the acquired data, it is difficult to generate a document lacking little data, that is, little information.

SUMMARY

According to an aspect of the embodiments, an information acquisition method includes: acquiring a specific piece of data using information for specifying a position of the specific piece of data in a document of a certain site by referring to a storage that stores therein information for specifying the position of the specific piece of data in the document of the certain site and information for specifying a position of another piece of data having a predetermined relation to the specific piece of data in the document, by a processor; and acquiring the other piece of data using the position of the other piece of data related to the specific piece of data in the document by referring to the storage, and acquiring data having the predetermined relation to the other piece of data using the acquired other piece of data, by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram illustrating a configuration example of a data acquisition device;
FIG. 2 is a diagram illustrating an example of a target storage unit;
FIG. 3 is a diagram illustrating an example of an item storage unit;
FIG. 4 is a diagram illustrating an example of a page storage unit;
FIG. 5 is a diagram illustrating an example of an extraction data storage unit.

DESCRIPTION OF EMBODIMENTS

Figure 6:
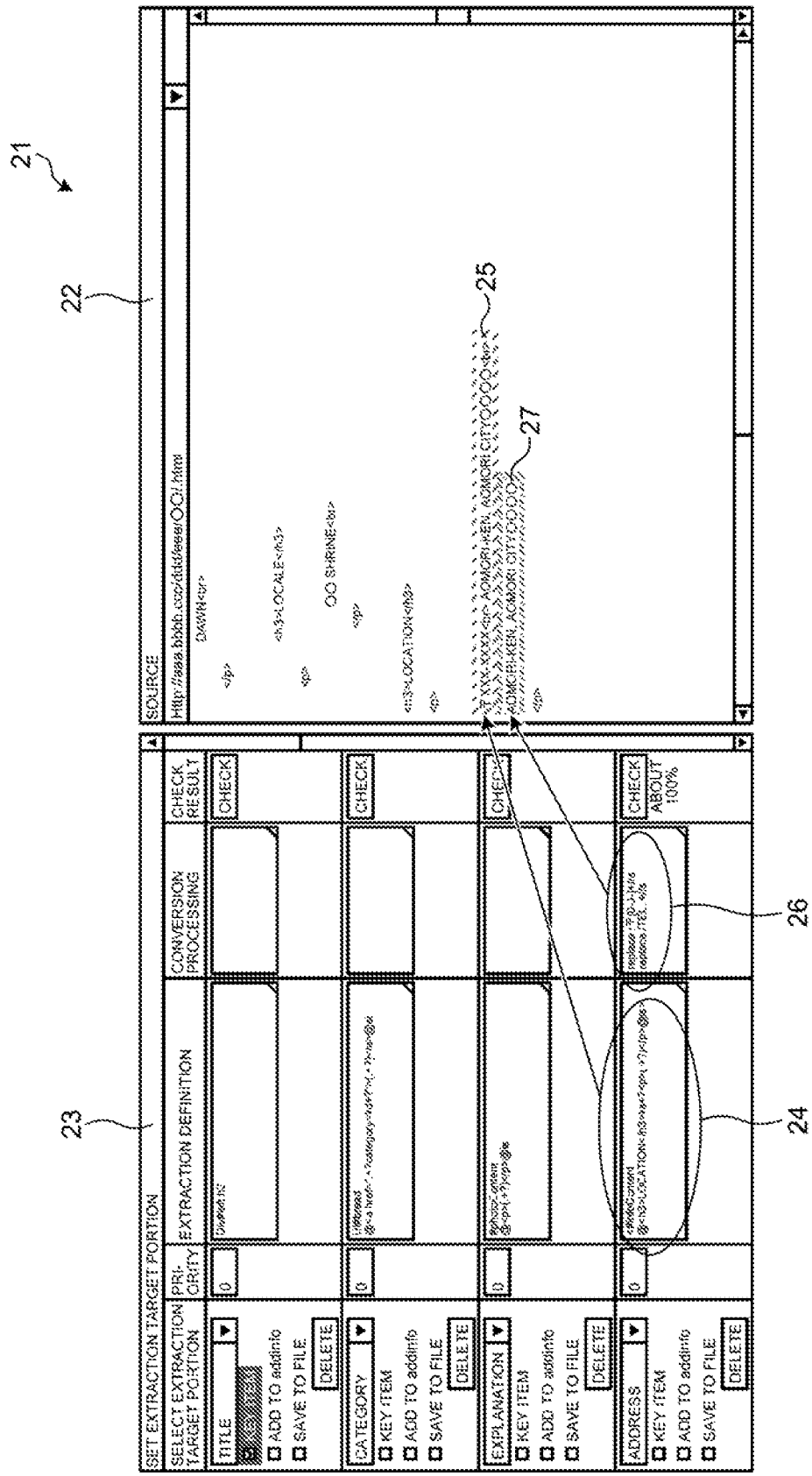
FIG. 6 is a diagram illustrating an example of a reception screen of an extraction target portion.

The following describes an embodiment of an information acquisition program, an information acquisition method, and an information acquisition device disclosed herein in detail based on the drawings. The disclosed technique is not limited to the embodiment. The following embodiments may be appropriately combined with each other without contradiction.

Embodiment

FIG. 1 is a block diagram illustrating a configuration example of a data acquisition device. For example, a data acquisition device 100 illustrated in FIG. 1 is connected to the Internet via a network N, crawls homepages (hereinafter, also referred to as sites) on the Internet designated by an administrator, and acquires predetermined data to be accumulated in a database. For example, to acquire tourism information of a certain region, the data acquisition device 100 crawls sites of a tourist spot and tourism information sites provided by the 47 prefectures of Japan, and acquires data such as an address, a phone number, and an explanation of each tourist spot. In this case, formats of various pieces of data are often not unified between sites of each tourist spot and a tourism information site. Thus, the data acquisition device 100 previously generates a definition of a data item to be acquired, and acquires data from each site based on the definition. All of desired pieces of data of information about a certain tourist spot are unable to be completely acquired through one site in some cases. Thus, the data acquisition device 100 supplements the information about the certain tourist spot using information of other sites and the like.

That is, the data acquisition device 100 stores, in a storage unit 120, information for specifying a position of a specific piece of data in a document of a certain site, and information for specifying a position of another piece of data having a predetermined relation to the specific piece of data in the document. The data acquisition device 100 acquires the specific piece of data using the information for specifying a position of the specific piece of data in the document in the certain site with reference to the storage unit 120. The data acquisition device 100 acquires the other piece of data using a position of the other piece of data related to the specific piece of data in the document with reference to the storage unit 120, and acquires data having a predetermined relation to the other piece of data using the acquired other piece of data. Accordingly, the data acquisition device 100 can supplement information to be described in a document lacking part of various pieces of data, that is, information to be described in the document.

Examples of the document include a document described in a markup language such as a HyperText Markup Language (HTML) document and an Extensible Markup Language (XML) document. By way of example, the following describes a case of crawling homepages using the HTML document and supplementing lacking data.

Next, the following describes the configuration of the data acquisition device 100. As illustrated in FIG. 1, the data acquisition device 100 includes an input unit 101, an output unit 102, a communication unit 110, a storage unit 120, and a control unit 130. The data acquisition device 100 is an example of an information acquisition device. The data acquisition device 100 may include various functional parts included in a known computer in addition to the functional parts illustrated in FIG. 1.

The input unit 101 is, fox example, an input device such as a keyboard and a mouse, and receives inputs of various pieces of information from an administrator of the data acquisition device 100. For example, the input unit 101 receives inputs of a URL of a site to be crawled, a data item to be acquired, and the like from the administrator of the data acquisition device 100, and outputs an input result to the control unit 130. The input unit 101 may be, for example, a reader/writer such as a secure digital (SD) memory card. For example, the input unit 101 outputs, to the control unit 130, the URL of the site to be crawled, the data item to be acquired, and the like read from the SD memory card. The input unit 101 may include both of the input device and the reader/writer such as the SB memory card.

The output unit 102 is, for example, a display device for displaying various pieces of information. For example, the output unit 102 is implemented with a liquid crystal display and the like as a display device. The output unit 102 may be a reader/writer such as an SB memory card. When receiving an input of output data from the control unit 130, the output unit 102 displays the output data or writes the output data into the memory card. The input unit 101 and the output unit 102 may be integrated with each other to be a device having both functions like the reader/writer such as the SD memory card, for example. The output unit 102 may include, for example, both of the display device and an SD card reader/writer.

The communication unit 110 is implemented with a network interface card (NIC), for example. The communication unit 110 is a communication interface that is connected to the Internet via the network N in a wired or wireless manner, for example, and rules information communication between itself and servers of various sites on the Internet. The communication unit 110 receives, from various sites on the Internet, page content such as an HTML document and an image file, and response information corresponding to inquiry information. The communication unit 110 outputs the received page content and response information to the control unit 130. The communication unit 110 transmits, to various sites on the Internet, a page request, inquiry information, and the like input from the control unit 130.

For example, the storage unit 120 is implemented with a semiconductor memory element such as a random access memory (RAM) and a flash memory, and a storage device such as a hard disk and an optical disc. The storage unit 120 includes a target storage unit 121, an item storage unit 122, a page storage unit 123, and an extraction data storage unit 124. The storage unit 120 stores therein information to be used for processing in the control unit 130.

The target storage unit 121 stores therein a URL of a site as a target of crawl processing for acquiring data (hereinafter, referred to as a target URL) and position specifying information of an extraction target portion in the HTML document in association with each other. That is, the target storage unit 121 stores therein a definition of the target URL. FIG. 2 is a diagram illustrating an example of the target storage unit. As illustrated in FIG. 2, the target storage unit 121 includes items such as "URLID", "target URL", and "position specifying information of extraction target portion". The item of "position specifying information of extraction target portion" includes items such as a "title" and "address". Although not illustrated, the position specifying information of the extraction target portion also includes items such as a facility name, a phone number, an update date, positional information, and an explanation. The target storage unit 121 stores therein, for example, each target URL as one record.

The item of "URLID" is used for identifying the target URL. The item of "target URL" indicates a URL of an HTML document to be accessed in crawl processing. The target URL is, for example, input by the administrator with an input device of the input unit 101. The item of "position specifying information of extraction target portion" indicates information for specifying the position of the extraction target portion in the HTML document of the target URL. The item of "title" indicates, regarding the title in the HTML document as a target, a position in a hierarchical structure of a tag by combining one or more of a name of the tag, an order of the tag in the document, and the hierarchical structure of the tag. The item of "address" indicates, regarding the address in the HTML document as a target, a position in the hierarchical structure of the tag by combining one or more of the name of the tag, the order of the tag in the document, and the hierarchical structure of the tag.

The first row in FIG. 2 exemplifies the position specifying information of the title and the address in the HTML document of the target URL "http://aaaa.bbb.ccc/ddd/eee/001.html" having the URLID of "1". The position specifying information of the title is, for example, represented as "<DIV class="title"> </DIV>, order 1,/title/". For example, "<DIV class="title"> </DIV>" indicates the name of the tag indicating the title extracted by using a cascading style sheets (CSS) selector. "order: 1" indicates the first tag among tags indicating the title in the HTML document. "/title/" indicates the hierarchical structure of the tag indicating the title of the HTML document. Data extracted as the title from the HTML document is a portion surrounded by DIV tags.

Similarily, the position specifying information of the address is represented as "<DIV class="address"> </DIV>, order: 1,/info/address/", for example. For example, "<DIV class="address"> </DIV>" indicates the name of the tag indicating the address extracted by using the CSS selector. "order: 1" indicates the first tag among tags indicating the address in the HTML document. "/info/address/" indicates the hierarchical structure of the tag indicating the address of the HTML document. Data extracted as the address from the HTML document is a portion surrounded by the DIV tags. The position specifying information of the extraction target portion may be specified using one or more of the name of the tag, the order of the tag, and the hierarchical structure of the tag.

The name of the tag may be represented by using a regular expression. In an example of the second row in FIG. 2, the name of the tag indicating the address is represented as "/<DIV.> (.+) </DIV>//address: (.+)$/". In the regular expression, a portion surrounded by the DIV tags or a portion following "address:" is the data to be extracted as the address. The position specifying information of the extraction target portion may be obtained by combining the CSS selector and the regular expression.

As exemplified in the third row of FIG. 2, the position specifying information of the extraction target portion may be represented by using a segmentation seethed. In this case, the position specifying information of the title is represented as "div#left h2, order: 3,/tps/table/" by using the CSS selector, for example. The position specifying information of the address is represented as "#infoContent @<h3> location </h3>¥s+?<p> (.+?)</p>@is, order: 5,/info/address/" by using the CSS selector and the regular expression, for example.

Returning to the description of FIG. 1, the item storage unit 122 stores therein the definition of the data item extracted from the page content of the target URL. FIG. 3 is a diagram illustrating an example of the item storage unit. As illustrated in FIG. 3, the item storage unit 122 includes items such as "item ID", "data name", "data type", "segmentation method", and "relation". For example, the item storage unit 122 stores therein each data name as one record.

The item of "item ID" is used for identifying the data item, that is, the data name. The item of "data name" indicates the name of data to be extracted. Examples of the data name include data such as a title, address (address information), a facility name (facility name information), a phone number, an update date, positional information (position coordinate information), and an explanation. The item of "data type" indicates the type of data in a case of storing the extracted data in the extraction data storage unit 124. Examples of the data type include types such as a character, a numeral, a date, and latitude and longitude. The item of "segmentation method" indicates a method of segmenting, that is, extracting data from the page content of the target URL. Examples of the segmentation method include the CSS selector and the regular expression. The item of "relation" indicates a related data name among data names. Examples of the relation include the data names such as the facility name, the phone number, and the positional information as the data names related to the address.

Returning to the description of FIG. 1, the page storage unit 123 stores therein the page content, that is, an HTML document, an image file, and the like acquired by accessing the target URL through crawl processing. FIG. 4 is a diagram illustrating an example of the page storage unit. As illustrated in FIG. 4, the page storage unit 123 includes items such as "URLID", "target URL", and "storage area". For example, the page storage unit 123 stores therein each target URL as one record.

The item of "URLID" is used for identifying the target URL. The item of "target URL" indicates the URL of the HTML document accessed through crawl processing. The item of "storage area" indicates a storage area in which the acquired HTML document, the acquired image file, and the like are stored. For example, the storage area stores therein a directory of a file system of the storage unit 120, and stores therein the HTML document, the image file, and the like in a corresponding directory. The page storage unit 123 may directly store the acquired HTML document and the acquired image file in the storage area.

Returning to the description of FIG. 1, the extraction data storage unit 124 stores therein the data of the extraction target portion extracted from the HTML document. That is, the extraction data storage unit 124 is a database that stores therein data collected through crawl processing. FIG. 5 is a diagram illustrating an example of the extraction data storage unit. As illustrated in FIG. 5, the extraction data storage unit 124 includes items such as "URLID", "title", "address", "facility name", "phone number", "update date", "positional information", and "explanation". For example, the extraction data storage unit 124 stores therein each URLID as one record.

The item of "URLID" is used for identifying the target URL. The item of "title" is one of data items extracted front the HTML document of the target URL, and indicates the title of the HTML document of the target URL. The item of "address" is one of the data items extracted from the HTML document of the target URL, and indicates the address described in the HTML document of the target URL. The item of "facility name" is one of the data items extracted from the HTML document of the target URL, and indicates the name of the facility described in the HTML document of the target URL. When the title is identical to the facility name, the same data as the title may be used as the facility name.

The item of "phone number" is one of the data items extracted from the HTML document of the target URL, and indicates the phone number described in the HTML document of the target URL. The item of "update date" is one of the data items extracted from the HTML document of the target URL, and indicates the update date described in the HTML document of the target URL. The item of "positional information" indicates latitude and longitude. The latitude and longitude is acquired, for example, by using an external application programming interface (API) service based on the address extracted from the HTML document of the target URL. If the latitude and longitude are described in the HTML document, the positional information may be this latitude and longitude. The item of "explanation" is one of the data items extracted from the HTML document of the target URL, and indicates, when the HTML document of the target URL is a document related to a tourist spot, an explanation about the tourist spot in the document, for example. When each item such as the address is not described in the HTML document, for example, the item may be an address and the like acquired by using the external API service using a name of the tourist spot described in the title.

Returning to the description of FIG. 1, for example, the control unit 130 is implemented when a central processing unit (CPU), a micro processing unit (MPU), and the like execute a computer program stored in an internal storage device using a RAM as a working area. For example, the control unit 130 may be implemented by an integrated circuit such as an application specific integrated circuit (ASIC) and a field programmable gate array (FPGA). The control unit 130 includes a registration unit 131, a crawl unit 132, an extracting unit 133, a supplement unit 134, and an output control unit 135, and implements or executes a function or operation of information processing described below. The internal structure of the control unit 130 is not limited to the structure illustrated in FIG. 1, and may be any other structure for performing information processing described later.

The registration unit 131 registers a definition of the target URL and a definition of the data item. The registration unit 131 receives inputs of the data name, the data type, the segmentation method, and the relation as the extraction target portion when the administrator operates the input unit 101, for example. The registration unit 131 associates the received data name, data type, segmentation method, and relation with each other to generate the definition of the data item. The registration unit 131 stores the definition of the generated data item in the item storage unit 122. That is, the registration unit 131 registers the definition of the generated data item in the item storage unit 122. The item of relation may be automatically assigned by the registration unit 131 based on the input data name.

The registration unit 131 outputs a source of the HTML document corresponding to the target URL to the output unit 102 to be displayed. The registration unit 131 receives selection of the extraction target portion on the source of the HTML document corresponding to the displayed target URL when the administrator operates the input unit 101, for example. The registration unit 131 may cause the HTML document of the target URL to be displayed, and receive selection of the extraction target portion on the HTML document.

The registration unit 131 specifies the position in the hierarchical structure of the tag corresponding to the received extraction target portion. The registration unit 131 determines the specified position in the hierarchical structure to be the position specifying information of the extraction target portion. The registration unit 131 determines the name of the tag corresponding to the extraction target portion and the order of the tag in the document to be the position specifying information of the extraction target portion in addition to the specified position in the hierarchical structure. The registration unit 131 receives selection of the extraction target portion for each data item in the HTML document of the target URL, and specifies the position in the hierarchical structure of the tag. When there are a plurality of target URLs, the registration unit 131 similarly specifies the position in the hierarchical structure of the tag corresponding to the extraction target portion for the HTML document corresponding to each of the target URLs. The registration unit 131 associates the target URL with the position specifying information of the extraction target portion to generate the definition of the target URL. The registration unit 131 stores the generated definition of the target URL in the target storage unit 121. That is, the registration unit 131 registers the generated definition of the target URL in the target storage unit 121.

The following describes the reception screen of the extraction target portion with reference to FIG. 6. FIG. 6 is a diagram illustrating an example of the reception screen of the extraction target portion. As illustrated in FIG. 6, a reception screen 21 includes a region 22 for displaying the source of the HTML document and a region 23 for receiving selection of the extraction target portion. For example, when the registration unit 131 receives selection of the address as the extraction target portion, the address is selected in a selection column of the extraction target portion in the region 23. When the address is selected, the registration unit 131 reads out the definition of the data item corresponding to the address from the item storage unit 122 to be displayed in an extraction definition column 24. The extraction definition column may be displayed as editable text.

The registration unit 131 causes a portion corresponding to one or more of the CSS selector and the regular expression in the extraction definition column 24 to be displayed on the source displayed in the region 22 as an extraction target portion 25 having a colored background, for example. When the administrator confirms the extraction target portion 25 and a select button on a user interface (not illustrated) is pressed, for example, the registration unit 131 receives selection of the extraction target portion 25. Alternatively, for example, when the extraction target portion 25 in the region 22 is selected through a mouse operation by the administrator, the registration unit 131 may receive the selected extraction target portion 25.

Additionally, the registration unit 131 may perform conversion processing of deleting an unneeded character on the extraction target portion 25. In the example of FIG. 6, the registration unit 131 performs conversion processing on a character string of the extraction target portion 25 using a conversion definition in a conversion processing column 26 set by the administrator. For example, the registration unit 131 inserts a conversion result 27 under the extraction target portion 25 to be displayed with a background colored in a different color from that of the extraction target portion 25. When conversion processing is performed, the registration unit 131 can cause the conversion result 27 to be selected and received as the extraction target portion.

Returning to the description of FIG. 1, the crawl unit 132 refers to the target storage unit 121, and accesses a homepage including the target URL, for example, a top page of a certain tourism information site. That is, the crawl unit 132 transmits a page request to a server of the certain tourism information site via the communication unit 110, and receives page content from the server via the communication unit 110. For example, the crawl unit 132 accesses the homepage including the target URL regularly or irregularly, that is, at intervals previously designated by the administrator or at an optional timing. The designated interval may be, for example, an optional interval such as a day, a week, and a month. The crawl unit 132 refers to the target storage unit 121 to select, from among all links in the homepage, the target URL from which the page content is acquired. For example, the crawl unit 132 selects the target URL of a page for each tourist spot. The crawl unit 132 acquires the page content from the selected target URL. The crawl unit 132 stores the acquired page content in the page storage unit 123. The crawl unit 132 outputs, to the extracting unit 133, acquisition completion information indicating that the page content is completely acquired.

When the acquisition completion information is input from the crawl unit 132, the extracting unit 133 refers to the position specifying information of the extraction target portion of the target storage unit 121, and extracts data of the data item of the extraction target portion from the page content of the target URL stored in the page storage unit 123. The extracting unit 133 associates the extracted data with the URLID to be stored in the extraction data storage unit 124 in accordance with the definition of the data item of the item storage unit 122.

The extracting unit 133 determines whether there is a specific piece of data in the extracted pieces of data. If the specific piece of data is extracted, the extracting unit 133 refers to the target storage unit 121 and the item storage unit 122, and extracts another piece of data based on the position specifying information of the other piece of data related to the extracted specific piece of data. For example, if the specific piece of data is the facility name and the facility name is extracted, the extracting unit 133 extracts, for example, the address as the other piece of data related to the facility name. The extracting unit 133 associates the extracted other piece of data with the URLID to be stored in the extraction data storage unit 124, and outputs extraction completion information to the supplement unit 134. If the extracted other piece of data is already stored in the extraction data storage unit 124, the extracting unit 133 outputs the extraction completion information to the supplement unit 134 without newly storing the other piece of data in the extraction data storage unit 124.

If the specific piece of data is unable to be extracted, the extracting unit 133 refers to the target storage unit 121 and the item storage unit 122, and extracts the other piece of data based on the position specifying information of the other piece of data related to the specific piece of data. For example, when the specific piece of data is the facility name and the facility name is unable to be extracted, the extracting unit 133 extracts, for example, the address as the other piece of data related to the facility name. The extracting unit 133 associates the extracted other piece of data with the URLID to be stored in the extraction data storage unit 124, and outputs, to the supplement unit 134, supplement request information for requesting to acquire data having a predetermined relation to the other piece of data. The data having a predetermined relation to the other piece of data includes the specific piece of data. In the example described above, the data having a predetermined relation to the other piece of data includes the facility name. When the extracted other piece of data is already stored in the extraction data storage unit 124, the extracting unit 133 outputs the supplement request information to the supplement unit 134 without newly storing the other piece of data in the extraction data storage unit 124.

To extract the data of the data item of the extraction target portion, the extracting unit 133 uses a method designated in the segmentation method of the item storage unit 122. For example, the extracting unit 133 extracts the address by using the CSS selector in which the hierarchy of the tag indicating the address is defined a s "/info/address/" and ".address" is described, for example. In this case, for example, the extracting unit 133 can segment out the item including "address" in the tag as the address.

For example, the extracting unit 133 extracts the address by using the regular expression in which ".info" is described in the first row, "/<DIV.*>(.+)</DIV>/" is described in the second row, and "/address:(.+)$/" is described in the third row. In this case, for example, the extracting unit 133 can segment, as the address, a character string following a character string of "address:" out of the hierarchy included in the tag in which a class of the DIV tag is "info".

When the extraction completion information is input from the extracting unit 133, the supplement unit 134 refers to the item storage unit 122 and the extraction data storage unit 124, and acquires data having a predetermined relation to the other piece of data from, for example, an API service on the Internet using the extracted other piece of data. For example, when the other piece of data is the address, the supplement unit 134 transmits, via the communication unit 110 and the network N, inquiry information including the address to a server providing the API service for returning positional information indicating latitude and longitude when receiving the address. When receiving response information with respect to the inquiry information from the server via the communication unit 110 and the network N, the supplement unit 134 acquires the positional information as data having a predetermined relation to the other piece of data. The supplement unit 134 stores, in the extraction data storage unit 124, the acquired data having a predetermined relation to the other piece of data, for example, the positional information corresponding to the address in association with the URLID of the target URL.

When receiving the supplement request information input from the extracting unit 133, the supplement unit 134 refers to the item storage unit 122 and the extraction data storage unit 124, and acquires data having a predetermined relation to the other piece of data from, for example, an API service on the Internet using the extracted other piece of data. For example, when the other piece of data is the address, the supplement unit 134 transmits, via the communication unit 110 and the network N, the inquiry information including the address to the server providing the API service for returning the facility name when receiving the address. When receiving the response information with respect to the inquiry information from the server via the communication unit 110 and the network N, the supplement unit 134 acquires the facility name as the data having a predetermined relation to the other piece of data. That is, the supplement unit 134 can supplement the facility name that is unable to be extracted from the HTML document.

For example, when the other piece of data is the address, the supplement unit 134 transmits, via the communication unit 110 and the network N, the inquiry information including the address to the server providing the API service for returning the positional information indicating latitude and longitude when receiving the address. When receiving the response information with respect to the inquiry information from the server via the communication unit 110 and the network N, the supplement unit 134 acquires the positional information as the data having a predetermined relation to the other piece of data. The supplement unit 134 stores, in the extraction data storage unit 124, the acquired data having a predetermined relation to the other piece of data, for example, the facility name and the positional information corresponding to the address in association with the URLID of the target URL. After storing the data having a predetermined relation to the other piece of data in the extraction data storage unit 124, the supplement unit 134 outputs output information to the output control unit 135.

That is, when processing of acquiring a specific piece of data is unable to be performed by using information for specifying the position of the specific piece of data in a document of a certain site, the extracting unit 133 uses the position of the other piece of data related to the specific piece of data in the document to acquire the other piece of data. The supplement unit 134 acquires data having a predetermined relation to the other piece of data using the acquired other piece of data. The supplement unit 134 associates the acquired data having a predetermined relation to the other piece of data with the URLID of the target URL to be stored in the extraction data storage unit 124. After storing the acquired data having a predetermined relation to the other piece of data in the extraction data storage unit 124, the supplement unit 134 outputs the output information to the output control unit 135.

As the API service, the supplement unit 134 can use a service of mutually returning a relation between the phone number and the facility name in addition to the service of returning the relation between the address and the positional information described above. As the API service, the supplement unit 134 may use an API service having a database associating the title, the facility name, the address, the phone number, the positional information, an official site, and the like with each other, for example, and when receiving one or more of these pieces of information, returning the other piece of information. For example, as the API service providing relation information between the address and the latitude and longitude, exemplified are the Google Maps API and the like that can provide information mutually related to the address and the latitude and longitude. For example, as the API service that can provide the information mutually related to the phone number and the facility name, exemplified are the Foursquare API and the like. In other words, the supplement unit 134 provides the other piece of data to a search engine corresponding to a predetermined relation to acquire data having the predetermined relation to the other piece of data.

The supplement unit 134 may acquire, as the data having a predetermined relation to the other piece of data, a plurality of pieces of data having a predetermined relation from an API service on the Internet. For example, when the facility name is unable to be extracted from the HTML document, the supplement unit 134 extracts the address related to the facility name from the HTML document, and acquires the positional information related to the address using the API service. For example, the supplement unit 134 extracts the phone number related to the facility name, and acquires the facility name related to the phone number using the API service. The supplement unit 134 may perform, on a plurality of pieces of data, processing of acquiring the second piece of data when the first piece of data is unable to be acquired, or perform processing of acquiring each of the pieces of data.

That is, when processing of acquiring a specific piece of data is unable to be performed by using information for specifying the position of the specific piece of data in a document of a certain site, the extracting unit 133 acquires a first piece of data using the position of the first piece of data related to the specific piece of data in the document. The supplement unit 133 acquires data having a first relation to the first piece of data using the acquired first piece of data. When the data having the first relation to the first piece of data is unable to be acquired, the extracting unit 133 acquires a second piece of data using the position of the second piece of data related to the specific piece of data in the document. The supplement unit 134 acquires data having a second relation to the second piece of data using the acquired second piece of data. The supplement unit 134 stores, in the extraction data storage unit 124, the data having the first relation to the acquired first piece of data or the data having the second relation to the second piece of data in association with the URLID of the target URL. After storing, in the extraction data storage unit 124, the data having the first relation to the acquired first piece of data or the data having the second relation to the second piece of data, the supplement unit 134 outputs output information to the output control unit 135.

When receiving the output information input from the supplement unit 134, the output control unit 135 refers to the extraction data storage unit 124, and outputs the extracted and acquired data as output data to the output unit 102 to be displayed. At the time of outputting the extracted data, when the data acquired and extracted through the past crawl processing or supplement processing is different from the data acquired and extracted through current crawl processing or supplement processing, for example, the output control unit 135 may change a display color. When the output unit 102 is a reader/writer such as an SD memory card, the output control unit 135 outputs the extracted and acquired data as the output data to the output unit 102 to be stored in the SD memory card and the like.

Next, the following describes an operation of the data acquisition device 100 according to the embodiment. First, the following describes definition generation processing of generating a definition of the target URL of crawl processing and a definition of the data item to be extracted.

Figure 7:
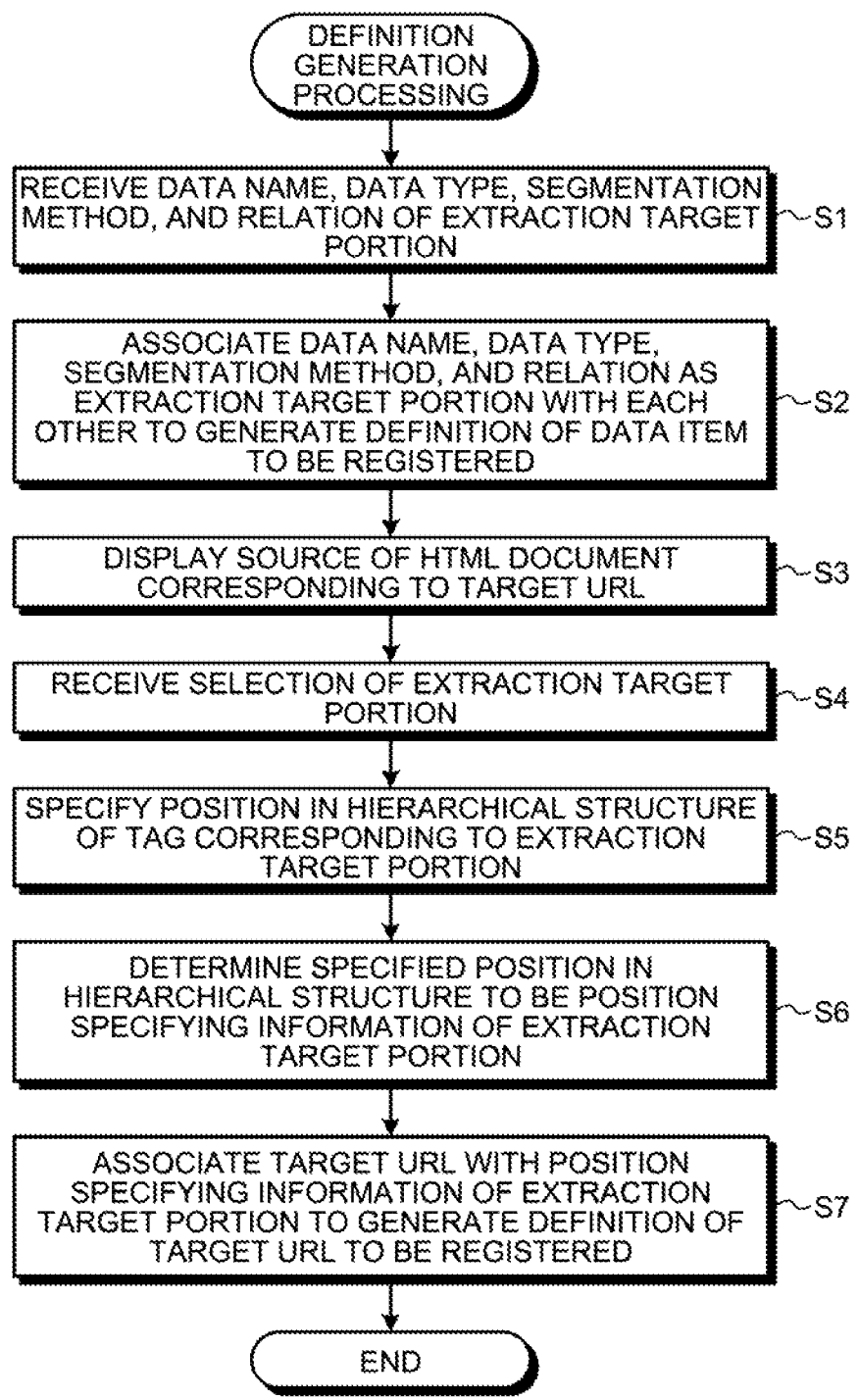
FIG. 7 is a flowchart illustrating an example of definition generation processing.

FIG. 7 is a flowchart illustrating an example of definition generation processing. For example, when the administrator operates the input unit 101, the registration unit 131 receives inputs of the data name, the data type, the segmentation method, and the relation as the extraction target portion (Step S1). The registration unit 131 associates the received data name, data type, segmentation method, and relation with each other to generate the definition of the data item. The registration unit 131 registers the generated definition of the data item in the item storage unit 122 (Step S2).

The registration unit 131 outputs, to the output unit 102, the source of the HTML document corresponding to the target URL to be displayed (Step S3). For example, when the administrator operates the input unit 101, the registration unit 131 receives selection of the extraction target portion on the displayed source of the HTML document corresponding to the target URL (Step S4). The registration unit 131 specifies the position in the hierarchical structure of the tag corresponding to the received extraction target portion (Step S5). The registration unit 131 determines the specified position in the hierarchical structure to be the position specifying information of the extraction target portion (Step S6). The registration unit 131 determines the name of the tag corresponding to the extraction target portion and the order of the tag in the document to be the position specifying information of the extraction target portion in addition to the specified position in the hierarchical structure. When there are a plurality of data items in the HTML document of the target URL, the registration unit 131 receives selection of the extraction target portion for each of the data items, and specifies the position in the hierarchical structure of the tag.

The registration unit 131 associates the target URL with the position specifying information of the extraction target portion to generate the definition of the target URL. The registration unit 131 registers the generated definition of the target URL in the target storage unit 121 (Step S7). Accordingly, the data acquisition device 100 can register the definition of the data item and the definition of the target URL.

Figure 8:
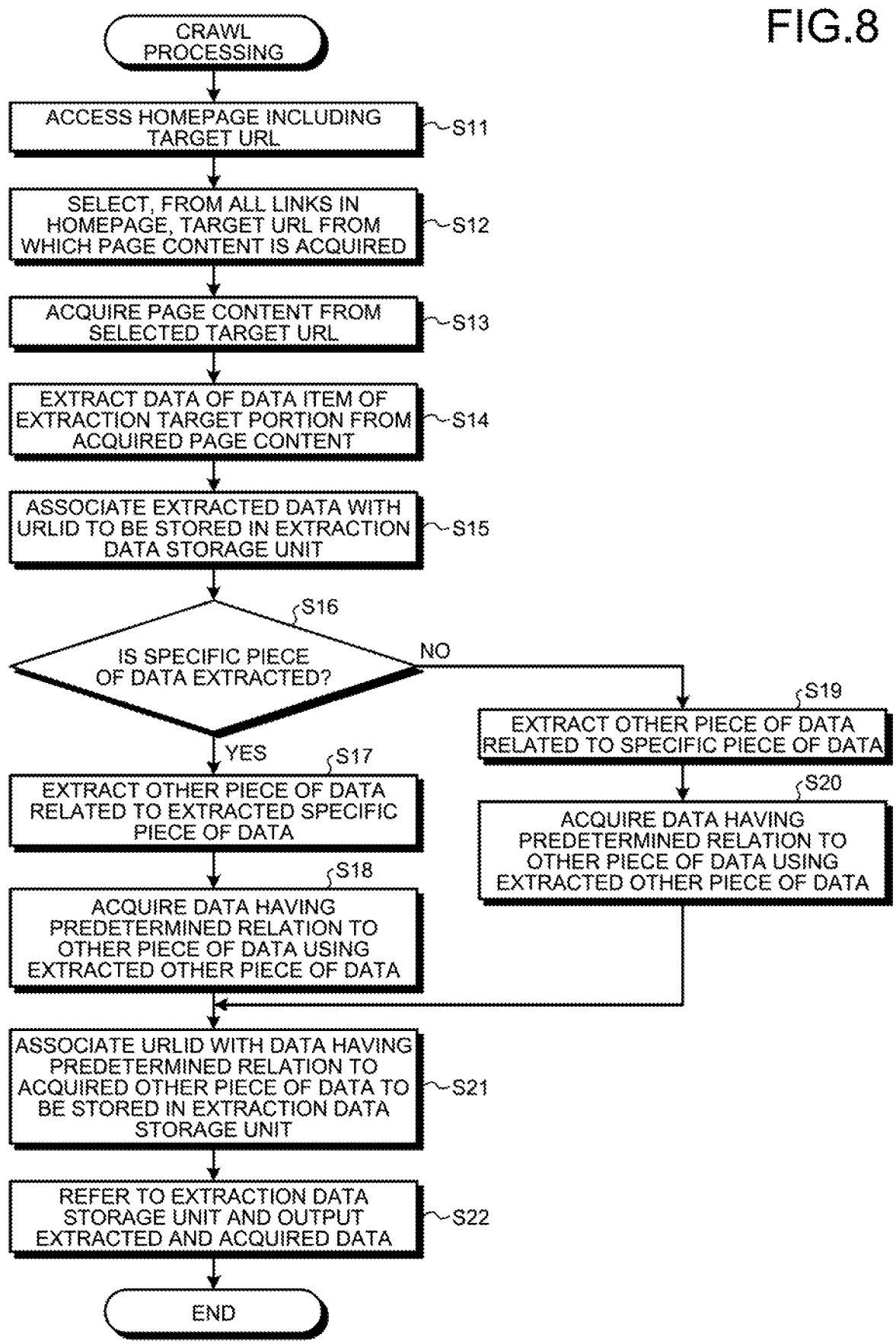
FIG. 8 is a flowchart illustrating an example of crawl processing.

Next, the following describes crawl processing. FIG. 8 is a flowchart illustrating an example of crawl processing. The crawl unit 132 refers to the target storage unit 121, and accesses a homepage including the target URL (Step S11). The crawl unit 132 refers to the target storage unit 121, and selects, from among all links in the homepage, the target URL from which page content is acquired (Step S12).

The crawl unit 132 acquires page content from the selected target URL (Step S13). The crawl unit 132 stores the acquired page content in the page storage unit 123. The crawl unit 132 outputs, to the extracting unit 133, the acquisition completion information indicating that the page content is completely acquired.

When receiving the acquisition completion information input from the crawl unit 132, the extracting unit 133 refers to the position specifying information of the extraction target portion in the target storage unit 121, and extracts data of the data item of the extraction target portion from the page content of the target URL stored in the page storage unit 123 (Step S14).

The extracting unit 133 associates the extracted data with the URLID to be stored in the extraction data storage unit 124 (Step S15). The extracting unit 133 determines whether there is a specific piece of data in the extracted pieces of data (Step S16). If the specific piece of data is extracted (Yes at Step S16), the extracting unit 133 refers to the target storage unit 121 and the item storage unit 122, and extracts the other piece of data based on the position specifying information of the other piece of data related to the extracted specific piece of data. (Step S17). After associating the extracted other piece of data with the URLID to be stored in the extraction data storage unit 124, the extracting unit 133 outputs the extraction completion information to the supplement unit 134.

When receiving the extraction completion information input from the extracting unit 133, the supplement unit 134 refers to the item storage unit 122 and the extraction data storage unit 124, and acquires data having a predetermined relation to the other piece of data using the extracted other piece of data (Step S18). The supplement unit 134 acquires the data having a predetermined relation to the other piece of data from, for example, an API service on the Internet.

If the specific piece of data is unable to be extracted (No at Step S16), the extracting unit 133 refers to the target storage unit 121 and the item storage unit 122, and extracts the other piece of data based on the position specifying information of the other piece of data related to the specific piece of data (Step S19). After associating the extracted other piece of data with the URLID to be stored in the extraction data storage unit 124, the extracting unit 133 outputs, to the supplement unit 134, the supplement request information for requesting to acquire data having a predetermined relation to the other piece of data.

When receiving the supplement request information input from the extracting unit 133, the supplement unit 134 refers to the item storage unit 122 and the extraction data storage unit 124, and acquires data having a predetermined relation to the other piece of data using the extracted other piece of data (Step S20). The supplement unit 134 acquires the data having a predetermined relation to the other piece of data from, for example, an API service on the Internet.

The supplement unit 134 associates the acquired data having a predetermined relation to the other piece of data with the URLID to be stored in the extraction data storage unit 124 (Step S21). After storing the data having a predetermined relation to the other piece of data in the extraction data storage unit 124, the supplement unit 134 outputs output information to the output control unit 135. When receiving the output information input from the supplement unit 134, the output control unit 135 refers to the extraction data storage unit 124, and outputs the extracted and acquired data as output data to the output unit 102 to be displayed (Step S22). Accordingly, the data acquisition device 100 can supplement lacking data, that is, lacking information using an API service, so that information to be described in the document can be supplemented.

Figure 9:
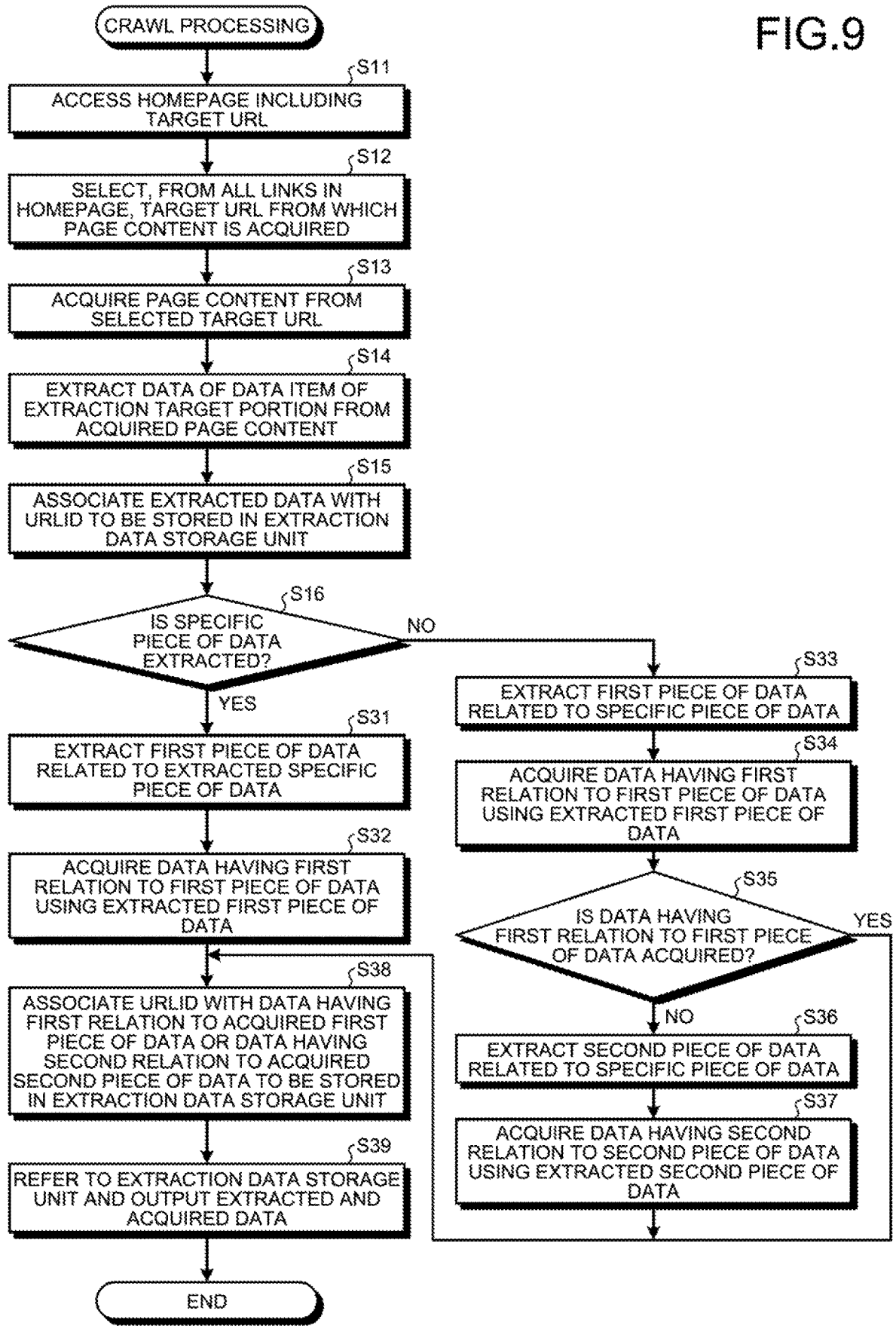
FIG. 9 is a flowchart illustrating another example of crawl processing.

Next, the following describes another example of crawl processing. FIG. 9 is a flowchart illustrating another example of crawl processing. The crawl processing illustrated in FIG. 9 is different from the crawl processing of FIG. 8 in that the other piece of data related to the specific piece of data is extracted and the data having a relation to the other piece of data is acquired for a plurality of pieces of data.

The crawl unit 132 refers to the target storage unit 121, and accesses the homepage including the target URL (Step S11). The crawl unit 132 refers to the target storage unit 121, and selects, from among all links in the homepage, the target URL from which the page content is acquired (Step S12).

The crawl unit 132 acquires the page content from the selected target URL (Step S13). The crawl unit 132 stores the acquired page content in the page storage unit 123. The crawl unit 132 outputs, to the extracting unit 133, the acquisition completion information indicating that the page content is completely acquired.

When receiving the acquisition completion information input from the crawl unit 132, the extracting unit 133 refers to the position specifying information of the extraction target portion in the target storage unit 121, and extracts data of the data item of the extraction target portion from the page content of the target URL stored in the page storage unit 123 (Step S14).

The extracting unit 133 associates the extracted data with the URLID to be stored in the extraction data storage unit 124 (Step S15). The extracting unit 133 determines whether there is a specific piece of data in the extracted pieces of data (Step 316). If the specific piece of data is extracted (Yes at Step S16), the extracting unit 133 refers to the target storage unit 121 and the item storage unit 122, and extracts the first piece of data based on the position specifying information of the first piece of data related to the extracted specific piece of data (Step S31). After associating the extracted first piece of data with the URLID to be stored in the extraction data storage unit 124, the extracting unit 133 outputs the extraction completion information to the supplement unit 134.

When receiving the extraction completion information input from the extracting unit 133, the supplement unit 134 acquires data having the first relation to the first piece of data from, for example, an API service on the Internet using the extracted first piece of data (Step S32).

If the specific piece of data is unable to be extracted (No at Step S16), the extracting unit 133 refers to the target storage unit 121 and the item storage unit 122, and extracts the first piece of data based on the position specifying information of the first piece of data related to the specific piece of data (Step S33). After associating the extracted first piece of data with URLID to be stored in the extraction data storage unit 124, the extracting unit 133 outputs, to the supplement unit 134, the supplement request information for requesting to acquire the data having the first relation to the first piece of data.

When receiving the supplement request information input from the extracting unit 133, the supplement unit 134 acquires the data having the first relation to the first piece of data from, for example, an API service on the Internet using the extracted first piece of data (Step S34).

The extracting unit 133 determines whether the supplement unit 134 has acquired the data having the first relation to the first piece of data (Step S35). If the supplement unit 134 has acquired the data having the first relation to the first piece of data (Yes at Step S35), the process of the extracting unit 133 proceeds to Step S38. If the supplement unit 134 is unable to acquire the data having the first relation to the first piece of data (No at Step S35), the extracting unit 133 extracts the second piece of data based on the position specifying information of the second piece of data related to the specific piece of data (Step S36). That is, the extracting unit 133 refers to the target storage unit 121 and the item storage unit 122, and extracts the second piece of data based on the position specifying information of the second piece of data related to the specific piece of data. After associating the extracted second piece of data with the URLID to be stored in the extraction data storage unit 124, the extracting unit 133 outputs, to the supplement unit 134, the supplement request information for requesting to acquire the data having the second relation to the second piece of data.

When receiving the supplement request information input from the extracting unit 133, the supplement unit 134 acquires the data having the second relation to the second piece of data from, for example, an API service on the Internet using the extracted second piece of data (Step S37).

The supplement unit 134 stores, in the extraction data storage unit 124, the data having the first relation to the acquired first piece of data or the data having the second relation to the acquired second piece of data in association with the URLID (Step S38). After storing the data having the first relation to the first piece of data or the data having the second relation to the second piece of data in the extraction data storage unit 124, the supplement unit 134 outputs the output information to the output control unit 135. When receiving the output information input from the supplement unit 134, the output control unit 135 refers to the extraction data storage unit 124, and outputs the extracted and acquired data as the output data to the output unit 102 to be displayed (Step S39). Accordingly, the data acquisition device 100 can acquire the second piece of related data when the first piece of related data is unable to be acquired, and can favorably supplement the information to be described in the document.

In this way, the data acquisition device 100 stores, in the storage unit 120, information for specifying the position of the specific piece of data in a document of a certain site and information for specifying the position of the other piece of data having a predetermined relation to the specific piece of data in the document. The data acquisition device 100 refers to the storage unit 120, and acquires the specific piece of data using the information for specifying the position of the specific piece of data in the document of the certain site. The data acquisition device 100 refers to the storage unit 120 to acquire the other piece of data using the position of the other piece of data related to the specific piece of data in the document, and acquires data having a predetermined relation to the other piece of data using the acquired other piece of data. As a result, information to be described in the document can be supplemented.

The data acquisition device 100 provides the other piece of data to the search engine corresponding to a predetermined relation to acquire data having the predetermined relation to the other piece of data. As a result, the information to be described in the document is favorably supplemented.

When the processing of acquiring the specific piece of data is unable to be performed using the information for specifying the position of the specific piece of data in the document of the certain site, the data acquisition device 100 acquires the other piece of data using the position of the other piece of data related to the specific piece of data in the document. The data acquisition device 100 acquires data having a predetermined relation to the other piece of data using the acquired other piece of data. As a result, even when the specific piece of data is unable to be extracted from the document, the specific piece of data can be supplemented using the other piece of data.

As the document, the data acquisition device 100 uses a document in which a markup language is used. As a result, the position of the data can be specified using the position in the hierarchical structure of the tag.

As the predetermined relation, the data acquisition device 100 uses the address information and the position coordinate information, or the phone number and the facility name information. As a result, the information to be described in the document can be favorably supplemented.

The data acquisition device 100 stores, in the storage unit 120, the information for specifying the position of the specific piece of data in the document of the certain site and the information for specifying the position of the first piece of data having the first relation to the specific piece of data in the document. The data acquisition device 100 stores, in the storage unit 120, information for specifying the position of the second piece of data having the second relation to the specific piece of data in the document. Referring to the storage unit 120, when the processing of acquiring the specific piece of data is unable to performed using the information for specifying the position of the specific piece of data in the document of the certain site, the data acquisition device 100 acquires the first piece of data using the position of the first piece of data related to the specific piece of data in the document. Referring to the storage unit 120, when the data having the first relation to the first piece of data is unable to be acquired, the data acquisition device 100 acquires the second piece of data using the position of the second piece of data related to the specific piece of data in the document. The data acquisition device 100 acquires data having the second relation to the second piece of data using the acquired second piece of data. As a result, the second piece of related data can be acquired when the first piece of related data is unable to be acquired, and the information to be described in the document can be favorably supplemented.

In the above embodiment, described is a case in which the other piece of data related to the specific piece of data is extracted and the data having a relation to the other piece of data is acquired for a plurality of pieces of data, and the number of the pieces of data is two. However, the embodiment is not limited thereto. For example, the number of extracted other pieces of data related to the specific piece of data and the number of acquired pieces of data having a relation to the other piece of data may be optional.

In the embodiment, exemplified is a case in which the address has a predetermined relation to the positional information, the phone number has a predetermined relation to the facility name, and they supplement each other. However, the embodiment is not limited thereto. For example, when the explanation of the tourist spot is unable to be acquired, the explanation may be acquired from an API service on the Internet, an official site of the tourist spot, and the like based on a name of the tourist spot or the facility name and the address of the tourist spot or the facility.

In the above embodiment, the data is extracted from the HTML document acquired from the site on the Internet. However, the embodiment is not limited thereto. For example, an HTML document stored in an SD memory card may be acquired via the input unit 101, data may be extracted from the acquired HTML document, and lacking data may be acquired from an API service on the Internet, an official site of the tourist spot, and the like to be supplemented.

The components of the units illustrated in the drawings are not always physically configured as illustrated. That is, specific forms of distribution and integration of the units are not limited to those illustrated in the drawings. All or part thereof may be functionally or physically distributed/integrated in arbitrary units depending on various loads or usage states. For example, the crawl unit 132 may be integrated with the extracting unit 133.

All or any part of various processing functions implemented with each device may be executed on a CPU (or a microcomputer such as an MPU and a micro controller unit (MCU)). It goes without saying that all or any part of the various processing functions may be executed on a computer program analyzed and executed by a CPU (or a microcomputer such as an MPU and an MCU), or on hardware based on wired logic.

Figure 10:
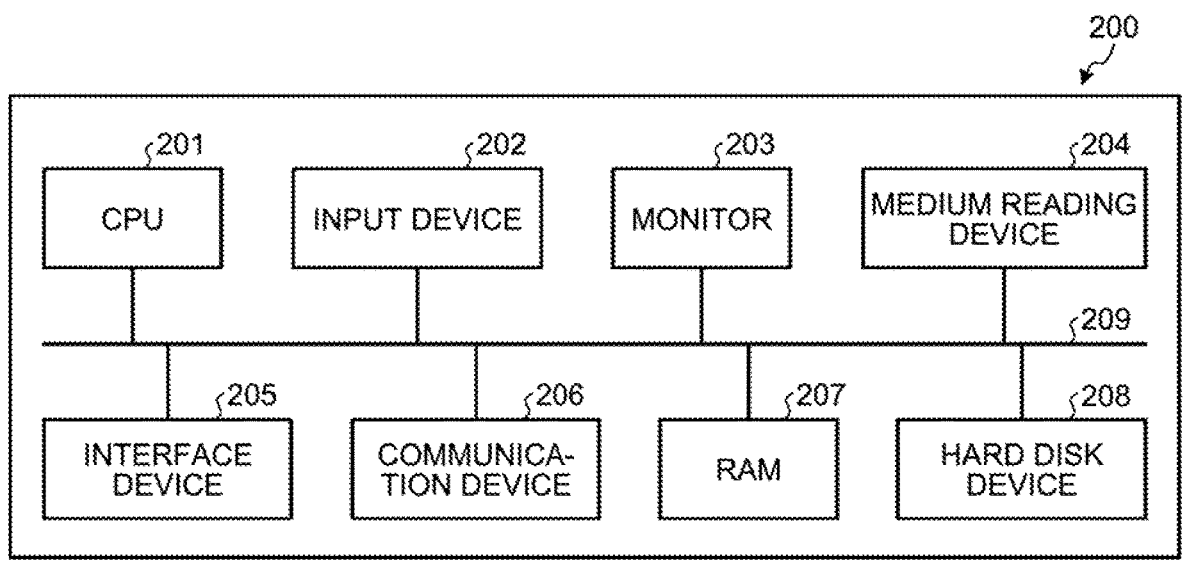
FIG. 10 is a diagram illustrating an example of a computer that executes an information acquisition program.

Various pieces of processing described in the above embodiment can be implemented by executing a computer program prepared in advance on a computer. The following describes an example of a computer that executes a computer program having the same function as that in the above embodiment. FIG. 10 is a diagram illustrating an example of the computer that executes an information acquisition program.

As illustrated in FIG. 10, a computer 200 includes a CPU 201 that performs various pieces of arithmetic processing, an input device 202 that receives a data input, and a monitor 203. The computer 200 also includes a medium reading device 204 that reads a computer program and the like from a storage medium, an interface device 205 for connecting the computer 200 with various devices, and a communication device 206 for connecting the computer 200 with another information processing device and the like in a wired or wireless manner. The computer 200 also includes a RAM 207 that temporarily stores therein various pieces of information, and a hard disk device 208. The devices 201 to 208 are connected to a bus 209.

The hard disk device 208 stores therein information acquisition programs having the same functions as the processing units including the registration unit 131, the crawl unit 132, the extracting unit 133, the supplement unit 134, and the output control unit 135 illustrated in FIG. 1. The hard disk device 208 also stores therein various pieces of data for implementing the target storage unit 121, the item storage unit 122, the page storage unit 123, the extraction data storage unit 124, and the information acquisition programs. The input device 202 has the same function as that of the input unit 101, and receives inputs of various pieces of information such as a target URL, a definition, and management information from an administrator of the computer 200, for example. The monitor 203 has the same function as that of the output unit 102, and displays various screens such as a screen of management information, a reception screen, and a data display screen to the administrator of the computer 200, for example. To the interface device 205, for example, a printing device is connected. For example, the communication device 206 has the same function as that of the communication unit 110 illustrated in FIG. 1, is connected to the network N, and exchanges various pieces of information with a site on the Internet.

The CPU 201 reads out each of computer programs stored in the hard disk device 208, and loads the computer program into the RAM 207 to be executed to perform various pieces of processing. These computer programs can cause the computer 200 to function as the registration unit 131, the crawl unit 132, the extracting unit 133, the supplement unit 134, and the output control unit 135 illustrated in FIG. 1.

The information acquisition programs described above are not always stored in the hard disk device 208. For example, the computer 200 may read out and execute a computer program stored in a storage medium that can be read by the computer 200. Examples of the storage medium that can be read by the computer 200 include a CD-ROM, a DVD disc, a portable recording medium such as a universal serial bus (USB) memory, a semiconductor memory such as a flash memory, and a hard disk drive. Alternatively, the information acquisition programs may be stored in devices connected to a public network, the Internet, a LAN, and the like, and the computer 200 may read out the information acquisition programs from such devices to be executed.

Information to be described in a document can be supplemented.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information acquisition method comprising:
   acquiring a specific piece of data among pieces of data from a document acquired from a source, using specific information for specifying a position of the specific piece of data in the document, the specific information being stored in a storage as position information that specifies, for each of the pieces of data, a position thereof in a hierarchical structure of the document, the storage also storing therein definition information that defines, for each of the pieces of data, a predetermined relation to another piece of data in the document, by a processor; and
   when the acquiring of the specific piece of data cannot be performed, specifying, by referring to the definition information stored in the storage another specific piece of data having the predetermined relation to the specific piece of data, acquiring, by referring to the position information stored in the storage, the other specific piece of data from the document, and acquiring related data having the predetermined relation to the other specific piece of data by providing the other specific piece of data to a search engine that provides search results having the predetermined relation to the other specific piece of data, by the processor.

2. The information acquisition method according to claim 1, wherein the document is a document in which a markup language is used.

3. The information acquisition method according to claim 1, wherein the predetermined relation is a relation between address information and position coordinate information, or a relation between a phone number and facility name information.

4. An information acquisition method comprising:
   acquiring a specific piece of data among pieces of data from a document acquired from a source, using specific information for specifying a position of the specific piece of data in the document, the specific information being stored in a storage as position information that specifies, for each of the pieces of data, a position thereof in a hierarchical structure of the document, the storage also storing therein definition information that defines, for each of the pieces of data, a first relation to a first piece of data and a second relation to a second piece of data in the document,
   when the acquiring of the specific piece of data cannot be performed, specifying, by referring to the definition information stored in the storage, a first alternate piece of data, having the first relation to the specific piece of data, acquiring, by referring to the position information stored in the storage, the first alternate piece of data from the document, and acquiring first related data having the first relation to the first alternate piece of data by providing the first alternate piece of data to a search engine that provides search results having the first relation to the first alternate piece of data, by a processor; and when the first related data having the first relation to the first alternate piece of data using the first alternate piece of data cannot be acquired, specifying, by referring to the definition information stores in the storage, a second alternate piece of data, having the second relation to the specific piece of data, acquiring, by referring to the position information stored in the storage, the second alternate piece of data from the document, and acquiring second related data having the second relation to the second alternate piece of data by providing the second alternate piece of data to a search engine that provides search results having the predetermined relation to the other specific piece of data, by the processor.

5. An information acquisition device comprising:
a processor configured to:
  store, in a storage, specific information, as position information that specifies, in a document acquired from a certain site, for each of pieces of data, a position thereof in a hierarchical structure of the document, and also store, for each of the pieces of data, definition information that defines a predetermined relation to another piece of data in the document; and when acquiring a specific piece of data among the pieces of data from the document using the position information for specifying a position of the specific piece of data in the document cannot be performed, specify, by referring to the definition information stored in the storage, another specific piece of data having a predetermined relation to the specific piece of data, acquire, by referring to the position information stored in the storage, the other specific piece of data from the document, and acquire related data having the predetermined relation to the other specific piece of data by providing the other specific piece of data to a search engine that provides search results having a predetermined relation to the other specific piece of data.

6. The information acquisition device according to claim 5, wherein the document is a document in which a markup language is used.

7. The information acquisition device according to claim 5, wherein the predetermined relation is a relation between address information and position coordinate information, or a relation between a phone number and facility name information.

* * * * *